US008260498B2

(12) United States Patent
Deng

(10) Patent No.: US 8,260,498 B2
(45) Date of Patent: Sep. 4, 2012

(54) FUNCTION DECOMPOSITION AND CONTROL ARCHITECTURE FOR COMPLEX VEHICLE CONTROL SYSTEM

(75) Inventor: Weiwen Deng, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 494 days.

(21) Appl. No.: 12/606,863

(22) Filed: Oct. 27, 2009

(65) Prior Publication Data
US 2011/0098886 A1     Apr. 28, 2011

(51) Int. Cl.
*A01B 69/00* (2006.01)
(52) U.S. Cl. .............. 701/41; 701/36; 701/70; 701/72; 477/75; 180/204
(58) Field of Classification Search ............. 701/1, 36, 701/37, 41, 38, 70, 82, 90, 91, 412, 72, 301; 303/20, 140; 280/5.503; 477/73, 75, 94; 180/204
See application file for complete search history.

(56) References Cited

U.S. PATENT DOCUMENTS

| | | | | |
|---|---|---|---|---|
| 5,351,776 A | * | 10/1994 | Keller et al. | 701/70 |
| 7,263,419 B2 | * | 8/2007 | Wheals et al. | 701/36 |
| 7,274,981 B2 | * | 9/2007 | Eriksson | 701/37 |
| 7,308,352 B2 | * | 12/2007 | Wang et al. | 701/70 |
| 7,472,006 B2 | | 12/2008 | Turski et al. | |
| 2003/0045978 A1 | | 3/2003 | Chandy | |
| 2006/0155451 A1 | | 7/2006 | Kuwahara et al. | |
| 2007/0004553 A1 | | 1/2007 | Oikawa et al. | |
| 2007/0067085 A1 | | 3/2007 | Lu et al. | |
| 2008/0140283 A1 | | 6/2008 | Kuwahara et al. | |

* cited by examiner

*Primary Examiner* — Gertrude Arthur Jeanglaude
(74) *Attorney, Agent, or Firm* — John A. Miller; Miller IP Group, PLC

(57) ABSTRACT

A vehicle control architecture designed based on a top-down approach with abstraction and modularity. The control architecture includes a vehicle/environment sensing and perception processor that processes sensor signals, and motion planning processors that provide lane center trajectory planning and tracking command, lane change trajectory planning and tracking command, and forward and backward speed and target tracking command. The architecture also includes a driver command interpreter that interprets driver commands and a command integration processor that provides reference dynamics for vehicle lateral, roll and longitudinal dynamics. The architecture also includes a control integration and supervisory controller that provides control integration and outputs integrated longitudinal force command signals, integrated lateral force command signals, integrated yaw moment command signals and steering torque command signals that are used by a vehicle longitudinal controller and a vehicle lateral controller.

20 Claims, 8 Drawing Sheets

FUNCTION DECOMPOSITION AND CONTROL ARCHITECTURE FOR COMPLEX VEHICLE CONTROL SYSTEM

BACKGROUND OF THE INVENTION

1. Field of the Invention

This invention relates generally to a control architecture for a vehicle system and, more particularly, to a control architecture for a complex vehicle control system that is designed in a hierarchical manner from top to bottom.

2. Discussion of the Related Art

Modern vehicles are complex electrical and mechanical systems that include many different parts and sub-systems, such as actuators, sensors, controllers, communication buses, etc., that are integrated in a hierarchical configuration. The design and integration of these various devices and sub-systems is a complex process that requires many different components and modules to interact with each other in an efficient and reliable manner.

Conventional vehicle control systems, such as anti-lock brake system (ABS), traction control system (TCS), electronic stability control system (ESC), etc., are typically developed independently of each other and are incorporated into the vehicle one at a time to achieve their individual objectives. Such a design process often results in resource and objective conflicts and a functional overlap between different component features and sub-systems that requires arbitrated control. Further, arbitrated control often leads to performance trade-offs or even conflict. Also, such a design technique tends to be more hardware dependent and has a lack of coordination and sharing of resources. Further, conventional vehicle control systems are mainly for driver-commanded vehicle dynamics, including ride, handling and stability, and lack of the ability to handle driver assist and active safety features, and sensor-guided autonomous or semi-autonomous driving with environmental sensors.

As a result of the increasing number and complexity of vehicle components and sub-systems with multiple cross-functions, the functional overlap and interaction of the components become inevitable with multiple objectives ranging from enhanced safety, comfort and convenience to fuel economy for inter-vehicle and vehicle to environmental controls. Further, many smart and adaptive vehicle features are enabled by 360° sensing, and also, longitudinal, lateral and roll dynamic controls with multiple active chassis and powertrain actuators.

The above-described conventional vehicle control systems are designed in a bottom-up based design approach in which features are developed one at a time, and added to the over-all system one-by-one, which often leads to system complication, unmanageability and lack of optimization. These systems are mainly feedback based with trial and error approaches, and often limit their applications to near-limit or non-linear operating regions. Typically, they are hardware dependent, with feature-based design from end-to-end that often limits reusability among common functionalities, and flexibility for fault tolerance, electrical architecture and supplier sourcing. Arbitrated controls are typically applied among the features that often lead to potential conflict and performance trade off.

In the bottom-up design approach discussed above, it is necessary to validate the operation of the control system by first building the control system and then determining its operability by trial and error. Thus, as more elements are added to the control system, the ability to provide such validation becomes more complex and costly. Therefore, because each supplier develops their components independent of each other, the complexity of integrating the components becomes much more complex, and the ability to interchange one supplier's component with another becomes problematic. Further, such a design strategy causes a number of duplications.

SUMMARY OF THE INVENTION

In accordance with the teachings of the present invention, a vehicle control architecture is disclosed that is designed based on top-down approach. The control architecture includes a vehicle/environment sensing and perception processor that processes signals from various sensor devices, such as vehicle inertia measurement units (IMU), cameras, radar, etc. The architecture also includes a first motion planning processor that receives the processed sensor signals from the vehicle/environment sensing and perception processor to provide lane center trajectory planning and tracking commands and lane change trajectory planning and tracking commands to generate desired vehicle longitudinal and lateral/roll dynamics signals and desired steering torque signals, and a second motion planning processor that receives the processed sensor signals from the vehicle/environment sensing and perception processor to provide forward speed and target tracking commands and backward speed and target tracking commands to generate desired vehicle longitudinal dynamics signals. The architecture further includes a driver command interpreter that receives primary driver command signals to interpret driver's steering, braking or throttle command to output desired vehicle longitudinal and lateral/roll dynamics signals and desired steering torque signals. The architecture also includes a command integration processor that receives the desired longitudinal dynamics signals, the desired lateral/roll dynamics signals and the desired steering torque signals from the driver command interpreter, the first motion planning processor and the second motion planning processor, and based on a reference vehicle dynamics model with vehicle longitudinal and lateral/roll dynamics, outputs integrated longitudinal vehicle dynamics signals, integrated lateral/roll vehicle dynamics signals and integrated steering torque command signals. The architecture further includes a control integration processor that receives the integrated longitudinal dynamics signals, the integrated lateral/roll dynamics signals and the integrated steering torque command signals from the command integration processor, and performs control integration to generate integrated commands with integrated vehicle lateral and longitudinal forces and yaw moment. The architecture further includes a supervisory controller that handles existing or supplier-provided modules, such as ABS, TCS, ESC, etc. The architecture also includes a vehicle longitudinal controller and a vehicle lateral controller, where the vehicle longitudinal controller receives the integrated longitudinal force command signals and the integrated yaw moment command signals from the control integration processor and supervisory controller and outputs brake torque command signals and engine throttle, gear shift and regenerative braking command signals, and the vehicle lateral controller receives the integrated yaw moment command signals, the integrated lateral force command signals and the steering torque command signals from the control integration processor and supervisory controller and outputs steering angle command signals and steering torque command signals.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a vehicle control architecture that is designed in a top-to bottom manner is merely exemplary in nature, and is in no way intended to limit the invention or its applications or uses.

As will be discussed in detail below, the present invention proposes a functional decomposition and control architecture for a vehicle that is commanded by integrated driver commands coordinated with sensor-guided assist controls to provide smoother activation and transition with less intrusion to the driver and fully integrated driver-vehicle-environment control. The proposed control architecture provides a top-down and synthesis-based design approach with system integration to provide a feed-forward dominate control that minimizes trial and error with faster control response and full operation regions for stability, comfort and performance. The control architecture reduces or eliminates confusion, uncertainty or indeterminacy in resulting actuator actions, and provides an optimum overall system performance and robustness. The function-based design approach of the control architecture includes abstraction and modularity that provides reusable, reconfigurable and plug-N-play modules to accommodate various actuators and sensors, applications and driver preferences, provides less hardware dependency with better flexibility for electrical architecture and for supplier sourcing, and is able to redistribute or reallocate loads or functions when a malfunction is detected in some actuators for better fault tolerance.

Figure 1:
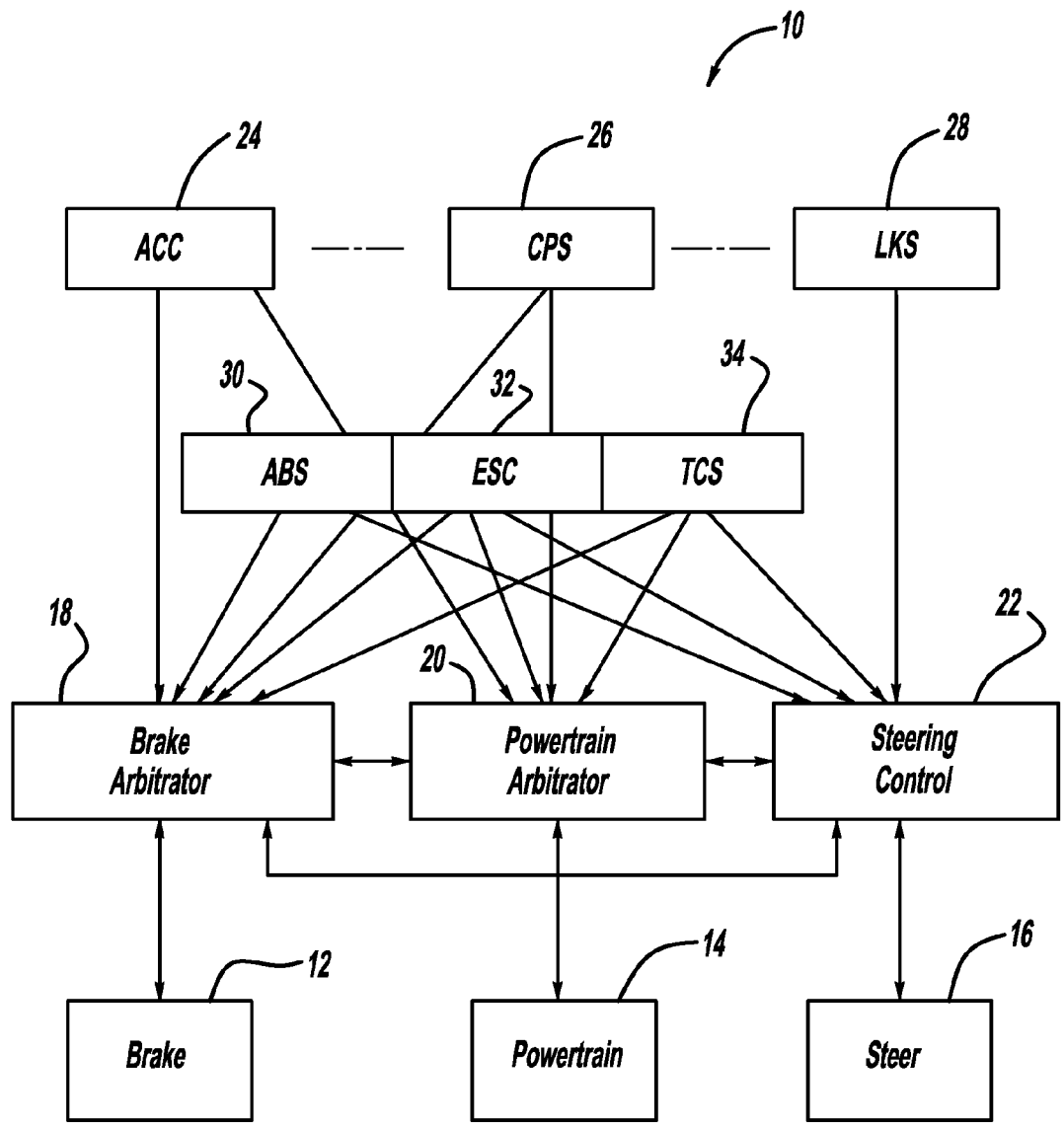
FIG. 1 is a block diagram of a conventional feature-based vehicle control architecture.

FIG. 1 is a typical conventional vehicle control system 10 illustrating a known architecture design for vehicle control systems that are designed in a bottom-up manner. The lower elements in the architecture 10 are independently developed, such as braking devices and sub-systems 12, powertrain devices and sub-systems 14 and steering devices and sub-systems 16. The braking devices 12 communicate with a brake arbitrator 18, the powertrain devices 14 communicate with a powertrain arbitrator 20 and the steering devices 16 communicate with a steering controller 22. The top of the architecture 10 includes various vehicle control and driver-assistance systems, such as adaptive cruise control (ACC) 24, a collision preparation system (CPS) 26, a lane keeping system (LKS) 28, etc. The ACC 24 communicates with the brake arbitrator 18 and powertrain arbitrator 20, and the LKS 28 communicates with the steering controller 22. The CPS 26 communicates with the brake arbitrator 18 and the powertrain arbitrator 20. A traction control system (TCS) 34 may communicate with the brake arbitrator 18, the powertrain arbitrator 20 and the steering controller 22. An ABS 30 communicates with the brake arbitrator 18 and the steering controller 22 and an ESC 32 communicates with the brake arbitrator 18, the powertrain arbitrator 20 and the steering controller 22.

As is apparent from this discussion, the brake arbitrator 18, the powertrain arbitrator 20 and the steering controller 22 may be receiving signals from several systems, such as the ACC 24, the ABS 30, the ESC 32, the TCS 24 and the LKS 28. In this multiple integration and interaction design, these elements may be receiving signals at the same time that may have different priorities and possibly may conflict. In the known design, it was up to the brake arbitrator 18, the powertrain arbitrator 20 and the steering controller 22 to determine which of those signals had the highest priority and would be acted on. Thus, the higher level features, such as the ACC 24, the CPS 26 and the LKS 28, did not contribute to those decisions. Therefore, the optimal control of the brake, powertrain or steering may not be implemented.

The architecture 10 represents a bottom-up based design approach where features are developed one at a time, and added one-by-one that often leads to system complication, unmanageability and lack of optimization. Typically, this design is actuator and sensor dependent with supplier-driven development. The feature-based design limits for reusability among functionalities and flexibility for fault tolerance, electrical architecture and supplier sourcing. The design is mainly feedback-based with a trial and error approach that often limits the applications to near-limit or non-linear operating regions. The arbitrated controls are among the features that often lead to potential conflict and performance tradeoff.

Figure 2A:
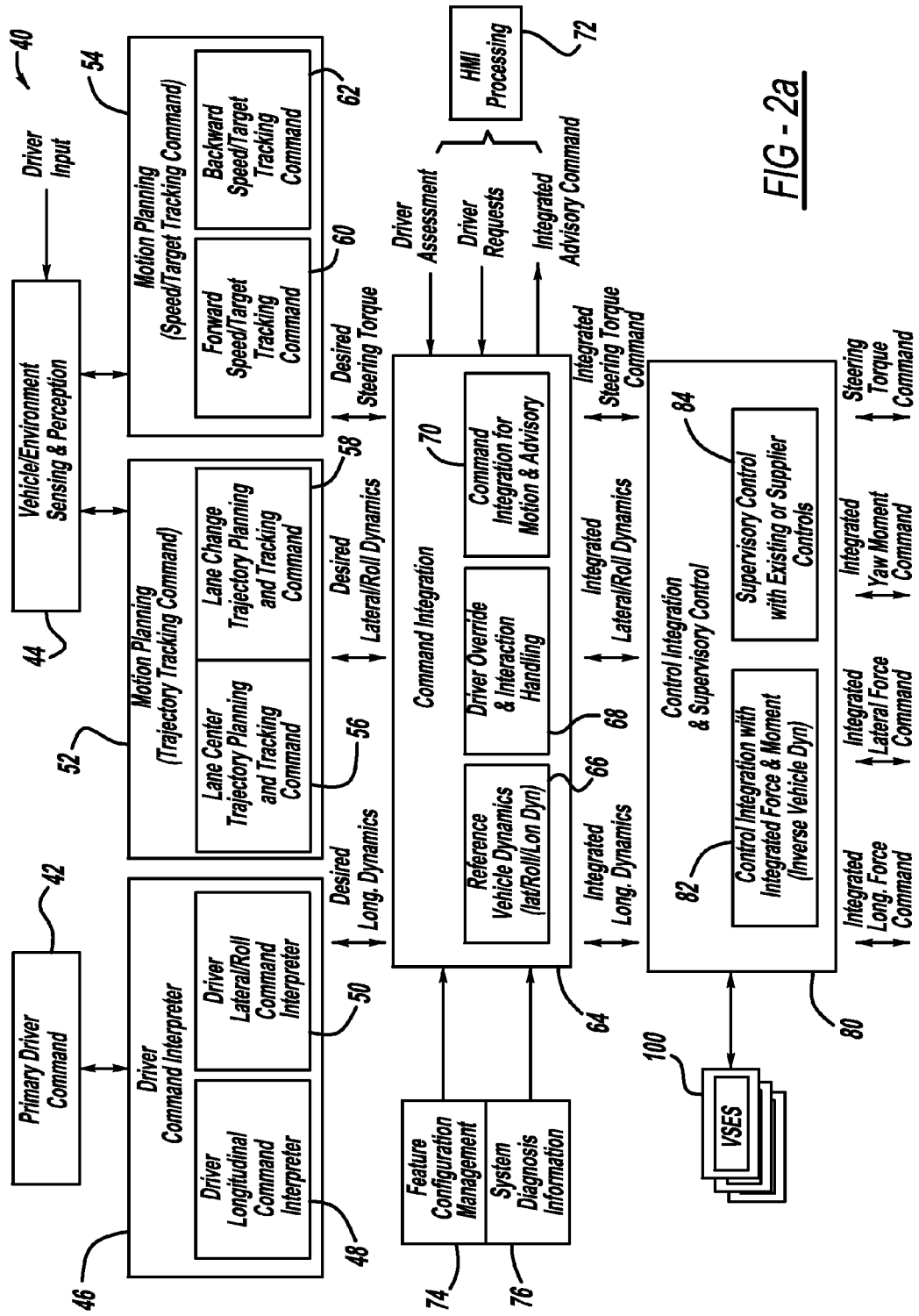
FIGS. 2a, 2b and 2c are a block diagram of a vehicle control and integration architecture.
Figure 2B:
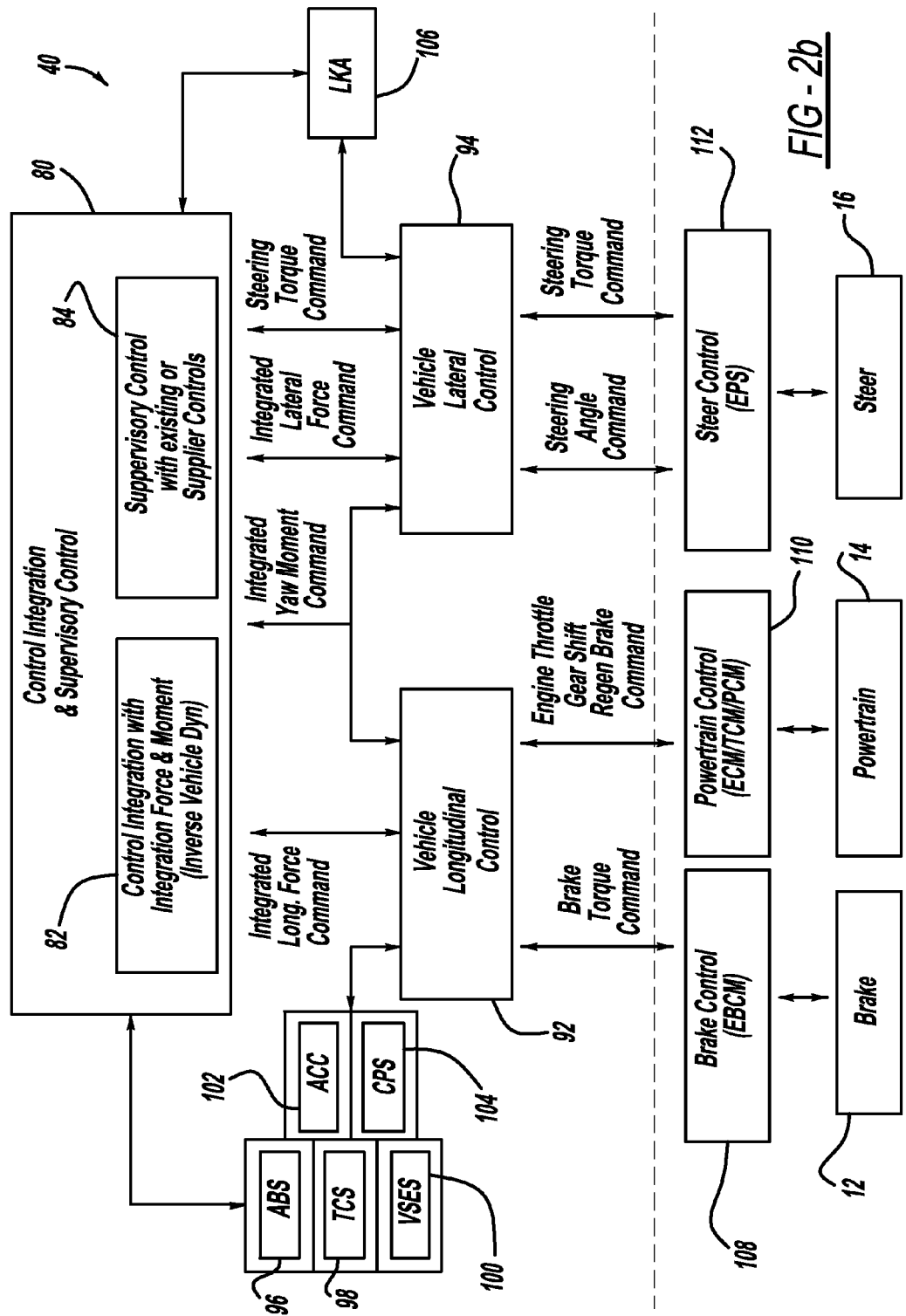
Figure 2C:
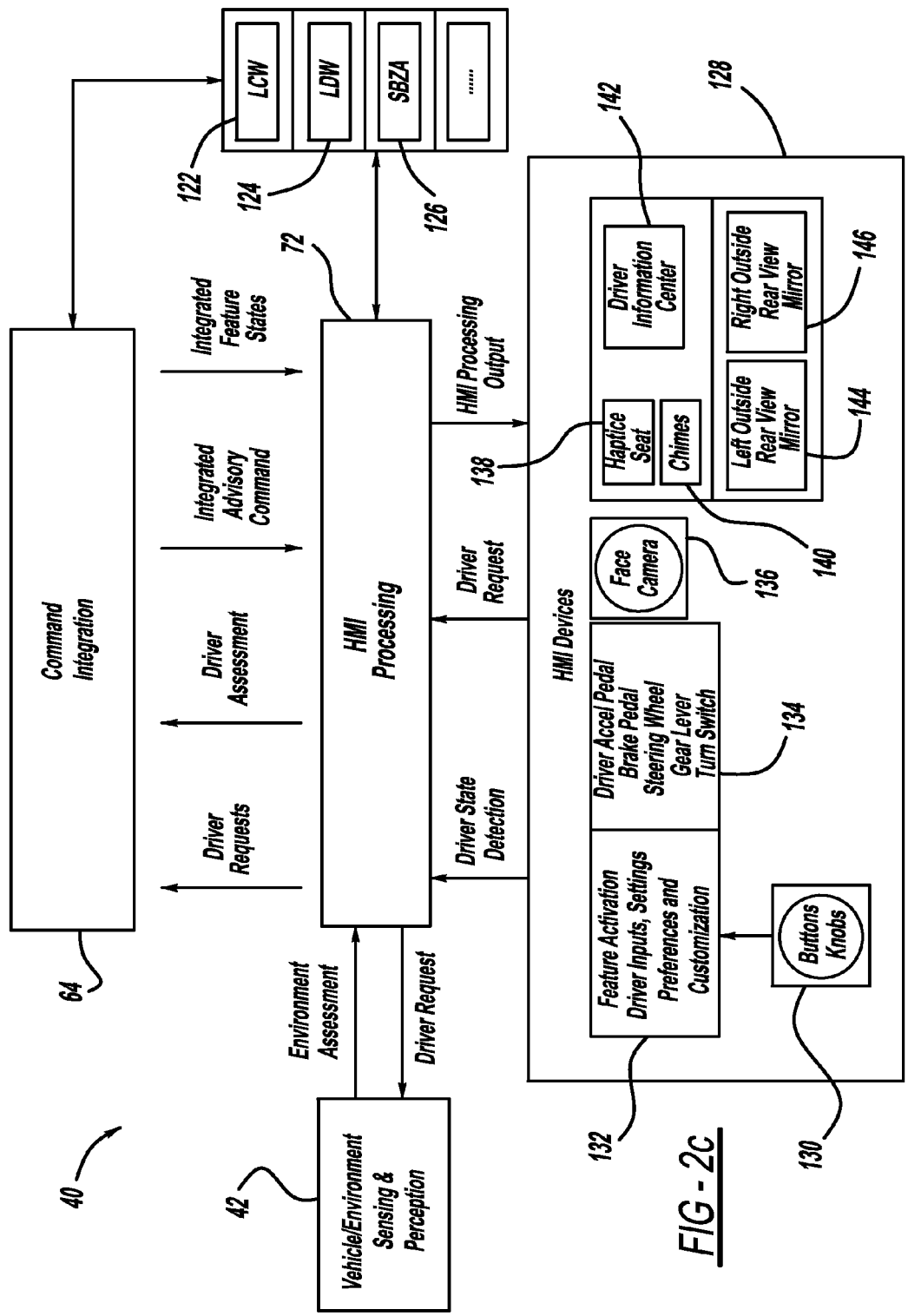

FIGS. 2a-2c are a block diagram of a vehicle control and integration architecture 40. Primary driver commands, such as braking, throttle and steering, at box 42 are provided to a driver command interpreter 46 that includes a driver longitudinal command interpreter 48 and a driver lateral/roll command interpreter 50 for interpreting the driver commands in both the longitudinal and lateral directions. The driver command interpreter 46 interprets driver commands to provide signals representing the desired longitudinal dynamics of the vehicle, the desired lateral and roll dynamics of the vehicle, and the desired steering torque respectively as command abstraction. The architecture 40 also includes a vehicle/environment sensing and perception processor 44 that receives driver input signals from the driver steering and provides sensor analysis in response thereto. The vehicle/environment sensing and perception processor 44 processes signals from various vehicle sensors and devices, such as IMU sensors, cameras, radar, etc., discussed in more detail below, to provide lane changing and lane centering information for the vehicle relative to its traveling lane. These processed sensor signals are provided to a motion planning processor 52 that provides a vehicle trajectory tracking command and a motion planning processor 54 that provides speed and target tracking commands. The motion planning processor 52 provides lane center trajectory planning and tracking commands at box 56 and lane changing trajectory planning and tracking commands at box 58. The motion planning processor 54 provides forward speed and target tracking commands at box 60 and backwards speed and target tracking commands at box 62. The motion planning processor 52 and the motion planning processor 54 each generates signals representing the desired longitudinal dynamics, lateral and roll dynamics of the vehicle and the desired steering torque of the vehicle, respectively, as command abstractions.

The desired longitudinal dynamics signals, the desired lateral and roll dynamics signals and the desired steering torque signals are provided to a command integration processor 64. The command integration processor 64 includes a reference vehicle dynamics processor 66 that defines the reference vehicle longitudinal, lateral and roll dynamics, a driver override and interaction handler 68 that determines and properly handles driver's override and interaction, and a command integration for motion and advisory processor 70 that provides integration for the vehicle actuators and a human/machine interface (HMI) processor 72. The HMI processor 72 provides driver assessment and driver request signals to the command integration processor 64 and receives integrated advisory commands from the processor 70. Further, the command integration processor 64 receives signals from a feature configuration management processor 74 and a system diagnosis information processor 76. The command integration processor 64 provides integrated commands for longitudinal dynamics of the vehicle, lateral/roll dynamics of the vehicle and steering torque commands that define the body dynamics of the vehicle and the steering torque command for the vehicle.

The architecture 40 also includes a control integration and supervisory controller 80 that receives integrated longitudinal dynamics signals, integrated lateral/roll dynamics signals and steering torque command signals from the command integration processor 64. The control integration and supervisory controller 80 includes a control integration processor 82 that converts the vehicle body dynamics into vehicle body forces and yaw moment, and more particularly converts the longitudinal and lateral dynamics of the vehicle into the longitudinal and later forces and yaw moment of the vehicle. The control integration and supervisory controller 80 also includes a supervisory controller 84 that provides supervisory control and arbitration for those sub-systems and components that may not be part of the overall original integration, such as a vehicle stability enhancement system (VSES) 100, ESC, ABS 96, TCS 98, ACC 102, CPS 104 or other existing and off the shelf components, that may need to be included into the architecture 40 by known techniques. The control integration and supervisory controller 80 provides integrated longitudinal force commands, integrated lateral force command, integrated yaw moment commands at the center of gravity level of the vehicle, and steering torque commands.

The architecture 40 also includes an LKA system 106, for example, as a possible existing feature that receives signals from and sends signals to the controller 80. The integrated longitudinal force commands and the integrated yaw moment commands from the controller 80 are provided to a vehicle longitudinal controller 92, along with signals from the various modules 86, and the integrated yaw moment commands, the integrated lateral force commands and the steering torque commands from the controller 80 are provided to a vehicle lateral controller 94, along with signals from other existing features, such as the LKA system 106. The controllers 92 and 94 handle hardware dependency and interfaces with supplier components and modules.

Using the integrated longitudinal force commands and the integrated yaw moment commands, the vehicle longitudinal controller 92 provides brake control commands to a brake controller 108 that controls the brake devices 12 and provides engine throttle, gear shift and regenerative braking commands to a powertrain controller 110 that controls the powertrain devices 14. In this architectural design, the brake controller 108 is not the brake arbitrator 18 and the powertrain controller 110 is not the powertrain arbitrator 20. Likewise, the vehicle lateral controller 94 uses the integrated yaw moment commands, the integrated lateral force commands and the steering torque commands to provide steering angle commands and steering torque commands to a steering controller 112 that controls the vehicle steering devices 16. As above, the steering controller 112 is not the steering controller 22.

As discussed above, the command integration processor 64 receives the desired longitudinal dynamics signals, the desired lateral/roll dynamics signals and the desired steering torque signals from the driver command interpreter 46, the motion planning processor 52 and the motion planning processor 54. The command integration processor 64 interacts with the HMI processor 72 from which it receives the driver request signals and driver assessment signals, and provides the integrated advisory command signals and integrated feature states. The vehicle/environment sensing and perception processor 42 also receives the driver request signals from the HMI processor 72 and provides environment assessment signals to the HMI processor 72. The command integration processor 64 and the HMI processor 72 both send and receive signals from other vehicle systems, such as a lane change warning system (LCW) 122, a lane departure warning system (LDW) 124, a side blind zone alert system (SBZA) 126, etc. The HMI processor 72 receives the driver request signals and driver's state detection signals from various HMI devices 128. The HMI processor 72 provides HMI processing output signals to the HMI devices 128. The HMI devices 128 can include any suitable human machine interface devices, including buttons and knobs 130, feature activation driver inputs, settings, preferences and customization devices 132, driver driving devices 134, such as acceleration pedal, brake pedal, steering wheel, gear lever, turn switch, etc., a vehicle camera 136 that takes images of the driver's face, haptic seat 138, warning chimes 140, driver information center 142, left rear-view mirror 144 and right rear-view mirror 146.

Figure 3A:
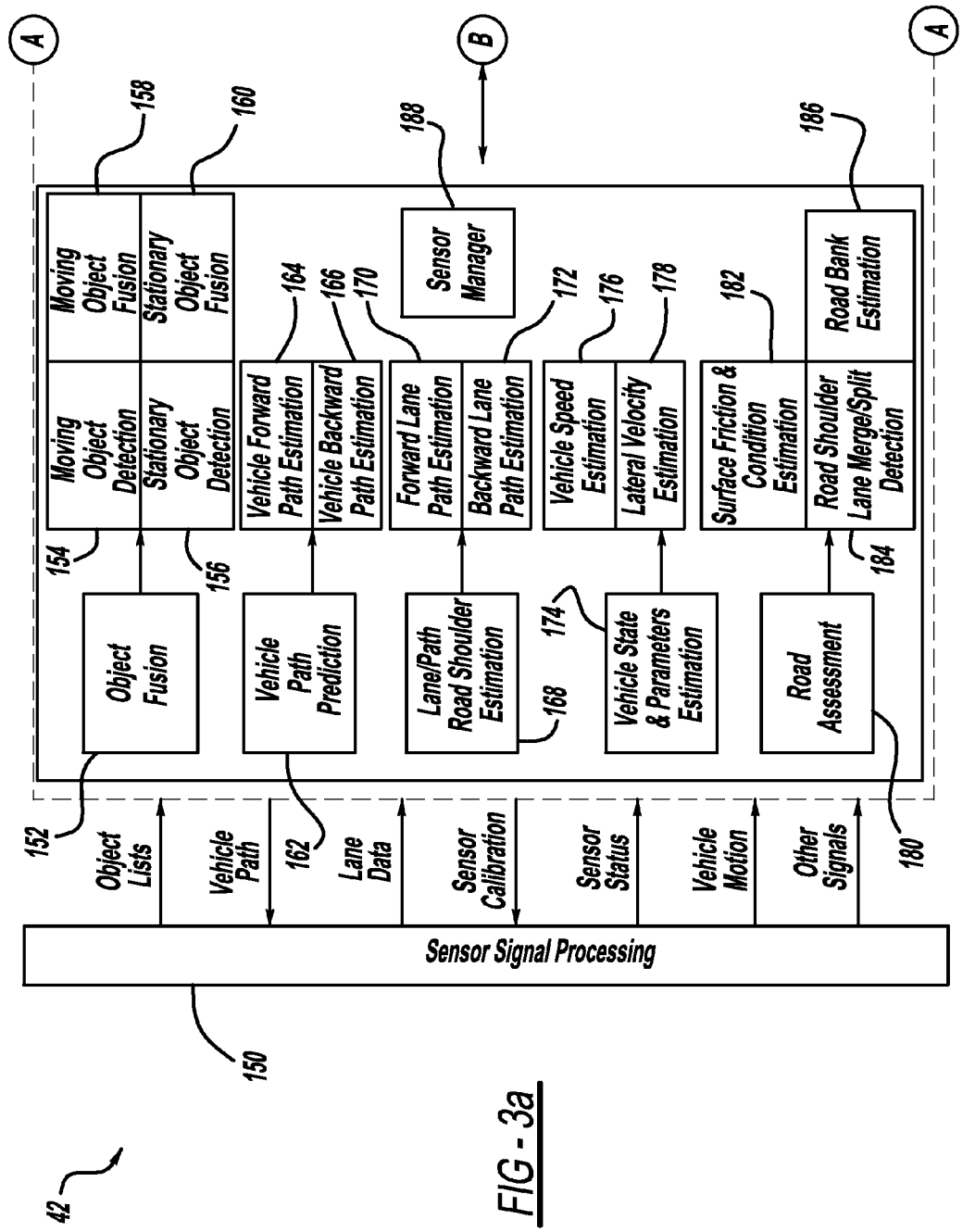
FIGS. 3a and 3b are a detailed block diagram of the vehicle/environment sensing and perception processor.
Figure 3B:
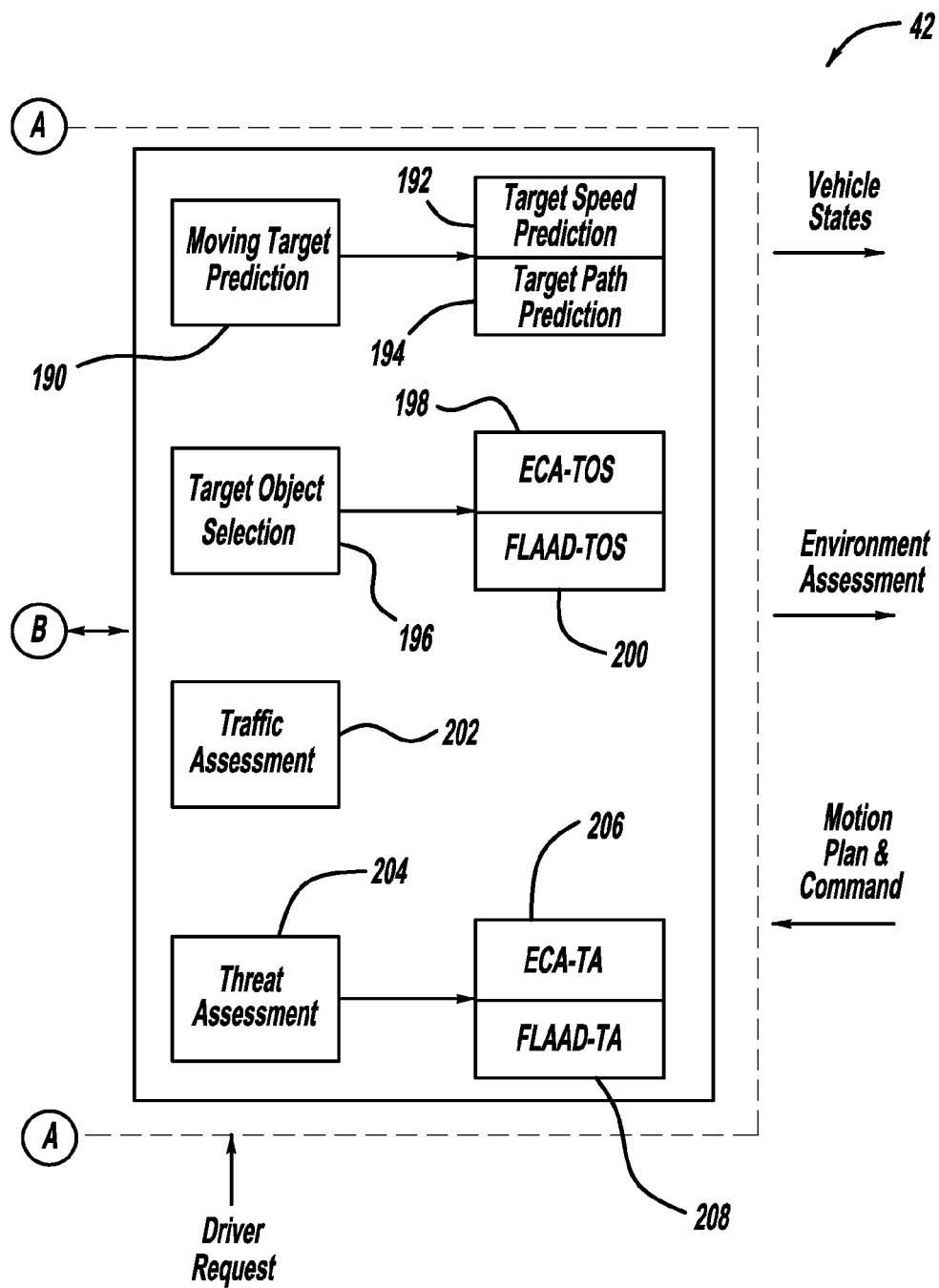

FIGS. 3a and 3b show a detailed block diagram of the vehicle/environment sensing and perception processor 42. The processor 42 receives various signals from a sensor processor 150 that receives signals from sensors that may be on the vehicle, discussed in more detail below such as object lists, i.e., vehicles that have been detected by radar, lane changing information, sensor status signals, vehicle motion signals, etc. Further, the processor 42 provides various signals to the sensor processor 150, such as vehicle path information, sensor calibration, etc. The object list information from the sensor processor 150 includes detected objects and vehicles and is used by object fusion at box 152 to identify moving objects at box 154 and stationary objects at box 156, and provide moving object fusion at box 158 and stationary object fusion at box 160. Further, vehicle path information is provided to a vehicle path prediction box 162 that provides vehicle forward path estimation at box 164 and vehicle backward path information at box 166. Also, the information from the sensor processor 150 is provided to a lane/path road shoulder estimation processor 168 that provides a forward lane path estimation at box 170 and a backward lane path estimation at box 172. The sensor signals also are processed by a vehicle state and parameter estimation processor 174 that provides vehicle speed estimation at box 176 and vehicle lateral velocity estimation at box 178. The sensor signals are also processed by a road assessment processor 180 that provides surface friction and condition estimation at box 182, road shoulder, lanes merge/split detection at box 184 and road bank and slope estimation at box 186. The processor 42 also includes a sensor manager 188 that manages the sensors.

The various and many pieces of data and other information that the processor 42 generates from the sensor signals can then be used by a moving target prediction sub-system 190 that provides target speed and prediction at box 192 and target path prediction at box 194. Further, this information can be used by a target object selection sub-system 196 that provide enhanced collision avoidance (ECA) for target object selection (TOS) at box 198 and freeway limited ability autonomous driving (FLAAD)-TOS at box 200. The information and data generated by the processor 42 can also be used by a traffic assessment sub-system 202 and a threat assessment sub-system 204 that provides ECA-threat assessment (TA) information at box 206 and FLAAD-TA information at box 208.

Figure 4A:
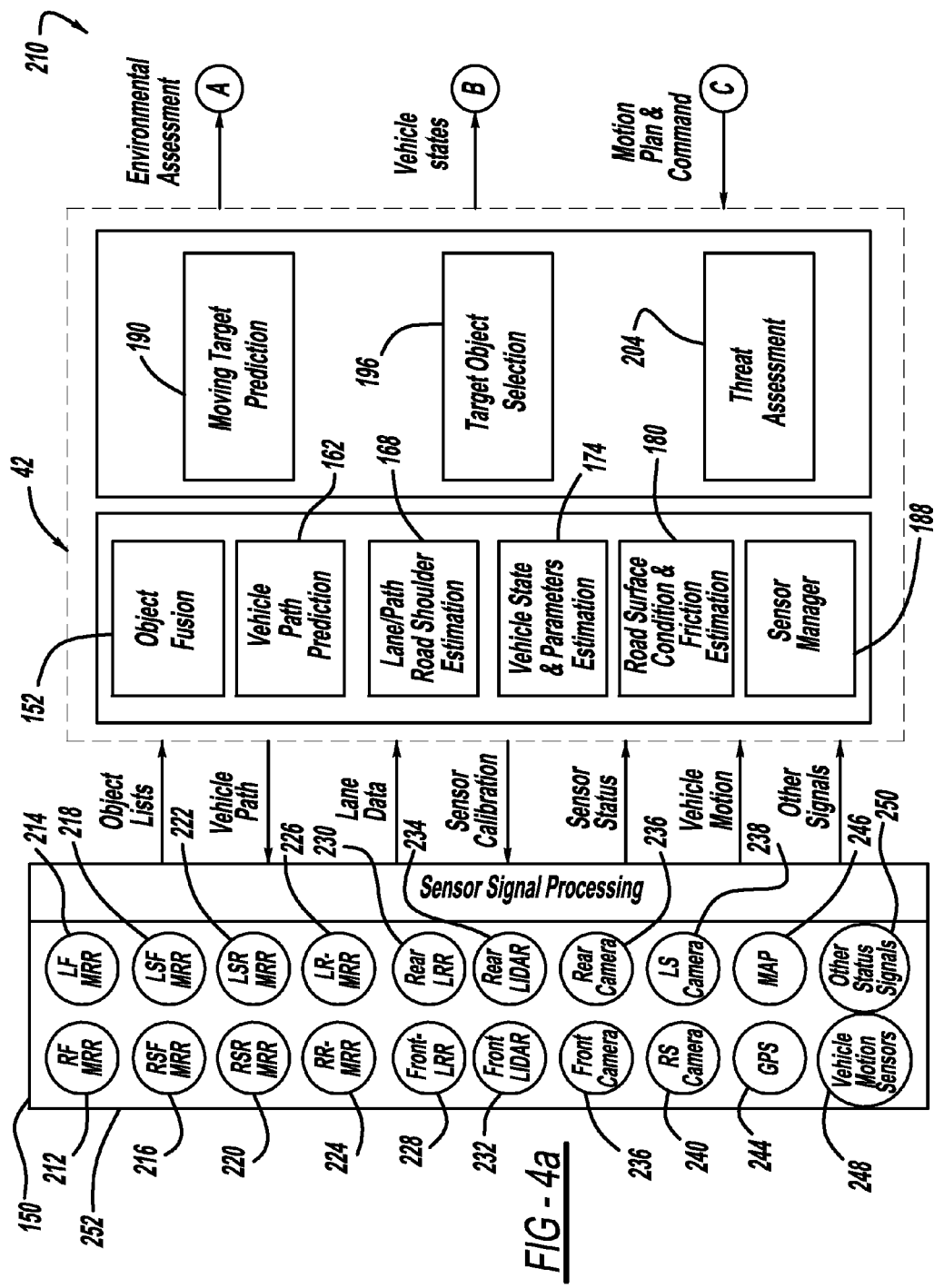
FIGS. 4a and 4b are a block diagram of a system that shows an overview of the architectures shown in FIGS. 1-3b.
Figure 4B:
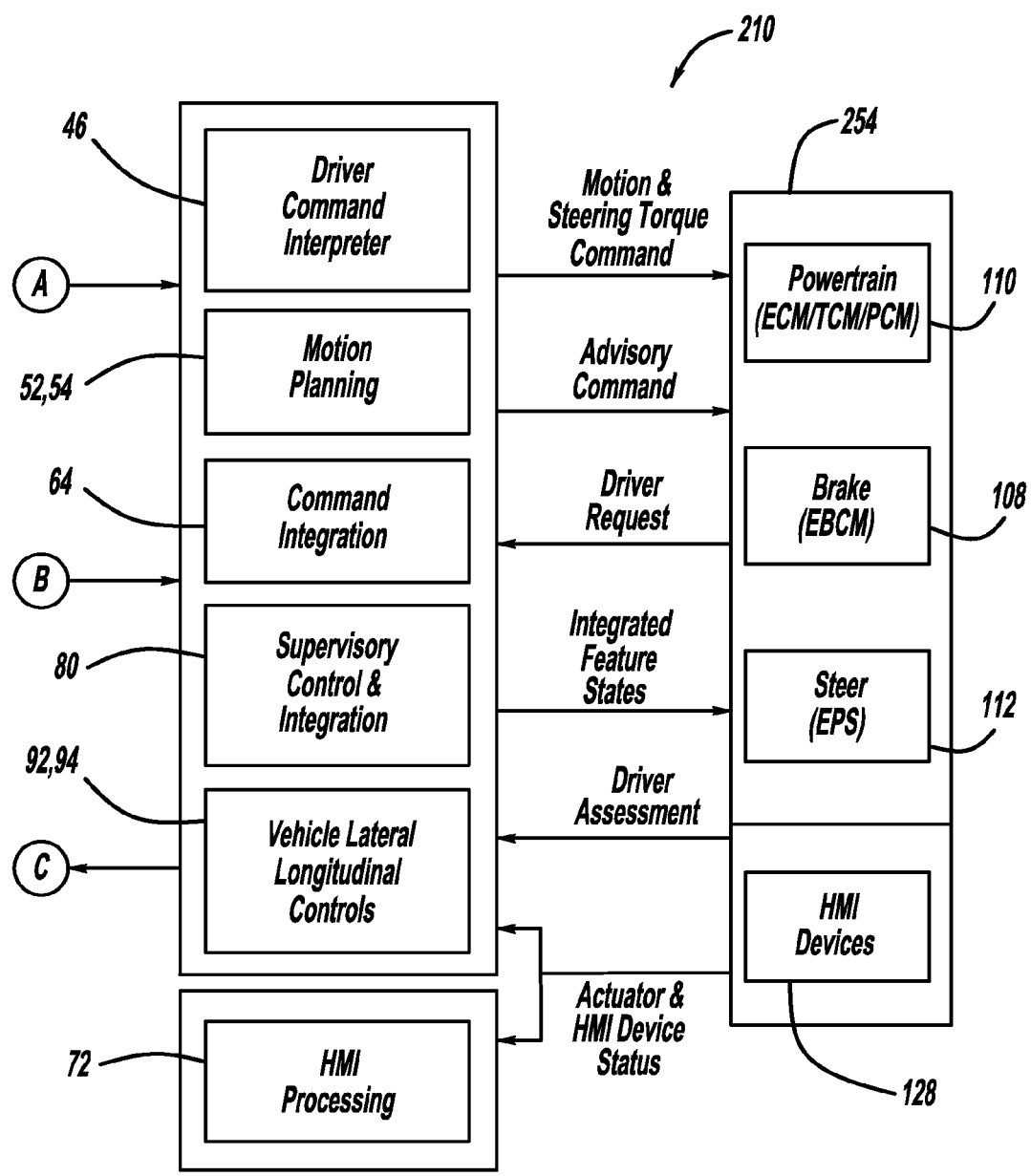

FIGS. 4a and 4b are a block diagram of a system 210 that shows a general overview of the entire architecture discussed above, where like elements are identified by the same reference number. The system 210 shows various sensors 252 that provide signals to the sensor signal processor 150 as examples, and include a right front (RF) medium range radar (MRR) 212, a left front (LF) MRR 214, a right-side front (RSF) MRR 216, a left-side front (LSF) MRR 218, a right-side rear (RSR) MRR 220, a left-side rear (LSR) MRR 222, a right rear (RR) MRR 224, a left rear (LR) MRR 226, a front long range radar (LRR) 228, a rear LRR 230, a front LIDAR 232, a rear LIDAR 234, a front camera 236 a rear camera 238, a right side (RS) camera 240, a left side (LS) camera 242, a GPS receiver 244, a map database 246, vehicle motion sensors 248, and other status signals 250. The driver command interpreter 46, the motion planning processors 52 and 54, the command integration processor 64, the supervisor control and integration controller 80, the vehicle lateral and longitudinal controllers 92 and 94 and the HMI processor 72 are all defined as control and integration algorithms. The powertrain controller 110, the brake controller 108, the steering controller 112 and the HMI devices 128 are defined as actuators and HMI devices 254.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A vehicle control architecture comprising:
   a vehicle/environment sensing and perception processor providing processed sensor signals;
   a first motion planning processor responsive to the processed sensor signals from the vehicle/environment sensing and perception processor, said first motion planning processor using the processed sensor signals to provide lane center trajectory planning and tracking commands and lane change trajectory planning and tracking commands, said first motion planning processor providing desired longitudinal and lateral/roll dynamics signals and desired steering torque signals;
   a second motion planning processor responsive to the processed sensor signals from the vehicle/environment sensing and perception processor, said second motion planning processor using the processed sensor signals to provide forward speed/target tracking command signals and backward speed and target tracking command signals, said sensor motion planning processor providing desired longitudinal dynamics signals;
   a driver command interpreter responsive to primary driver command signals, said driver command interpreter interpreting driver's steering, braking and/or throttle commands and generating desired longitudinal and lateral/roll dynamics signals and desired steering torque signals;
   a command integration processor responsive to the desired longitudinal dynamics signals from the driver command interpreter, the first motion planning processor and the second motion planning processor, the desired lateral/roll dynamics signals from the driver command interpreter and the first motion planning processor, and the desired steering torque signals from the driver command interpreter and the first motion planning processor, said command integration processor providing reference vehicle dynamics for vehicle lateral, roll and longitudinal dynamic and command integration for motion and advisory commands, said command integration processor outputting integrated longitudinal vehicle dynamics signals, integrated lateral/roll vehicle dynamics signals and integrated steering torque command signals; and
   a control integration and supervisory controller responsive to the integrated longitudinal dynamics signals, the integrated lateral/roll dynamics signals and the integrated steering torque command signals from the command integration processor, said control integration and supervisory controller providing control integration with vehicle integrated forces and yaw moment and supervisory control, and outputting integrated longitudinal force command signals, integrated lateral force command signals, integrated yaw moment command signals and steering torque command signals.

2. The architecture according to claim 1 further comprising a human/machine interface processor providing driver assessment signals and driver request signals to the command integration processor and receiving integrated advisory command signals from the command integration processor.

3. The architecture according to claim 1 further comprising a vehicle longitudinal controller and a vehicle lateral controller, said vehicle longitudinal controller being responsive to the integrated longitudinal force command signals and the integrated yaw moment command signals from the control integration and supervisory controller and outputting brake torque command signals and engine throttle, gear shift and regenerative braking command signals, said vehicle lateral controller being responsive to the integrated yaw moment command signals, the integrated lateral force command signals and the steering torque command signals from the control integration and supervisory controller and outputting steering angle command signals and steering torque command signals.

4. The architecture according to claim 3 further comprising a brake controller for controlling vehicle brakes, a powertrain controller for controlling a vehicle powertrain and a steering controller for controlling vehicle steering, said brake controller being responsive to the brake torque command signals from the vehicle longitudinal controller, said powertrain controller being responsive to the engine throttle, gear shift and regenerative braking command signals from the vehicle longitudinal controller and said steering controller being responsive to the steering angle command signals and the steering torque command signals from the vehicle lateral controller.

5. The architecture according to claim 3 further comprising an antilock braking system, a traction control system, a vehicle stability enhancement system, an adaptive cruise control system and a collision preparation system all receiving and providing signals to the control integration and supervisory controller and the vehicle longitudinal controller.

6. The architecture according to claim 3 further comprising a lane keeping assist system providing signals to and receiving signals from the control integration and supervisory controller and the vehicle lateral controller.

7. The architecture according to claim 1 wherein the vehicle/environment sensing and perception processor includes an object fusion sub-system that provides moving object detection, moving object fusion, stationary object detection and stationary object fusion, a vehicle path prediction sub-system that provides vehicle forward path estimation and vehicle backward path estimation, a lane/path estimation sub-system that provides forward lane path estimation and backward lane path estimation, a vehicle state and parameters estimation sub-system that provides vehicle speed estimation and vehicle lateral velocity estimation, and a road assessment sub-system that provides surface friction and condition estimation, road shoulder lane merge/split detection and road-bank and slope estimation.

8. The architecture according to claim 1 wherein the vehicle/environment sensing and perception processor includes a moving target prediction sub-system that provides target speed prediction and target path prediction, a target objection selection processor that provides enhanced collision avoidance for target object selection and freeway limited ability autonomous driving for target objection selection, a traffic assessment sub-system that provides traffic assessments and a threat assessment sub-system that provides enhanced collision avoidance for threat assessment and freeway limited ability autonomous driving for threat assessment.

9. The architecture according to claim 1 further comprising a plurality of sensors that provide sensor signals to the vehicle/environment sensing and perception processor to be processed, said sensors including a right front mid-range radar, a left front mid-range radar, a right-side front mid-range radar, a left-side front mid-range radar, a right-side rear mid-range radar, a left-side rear mid-range radar, a right rear mid-range radar, a left rear mid-range radar, a front long-range radar, a rear long-range radar, a front LIDAR, a rear LIDAR, a front camera, a rear camera, a right-side camera, a left-side camera, a GPS receiver, a map database and vehicle motion sensors.

10. A vehicle control architecture comprising:
a plurality of sensors including a right front mid-range radar, a left front mid-range radar, a right-side front mid-range radar, a left-side front mid-range radar, a right-side rear mid-range radar, a left-side rear mid-range radar, a right rear mid-range radar, a left rear mid-range radar, a front long-range radar, a rear long-range radar, a front LIDAR, a rear LIDAR, a front camera, a rear camera, a right-side camera, a left-side camera, a GPS receiver, a map database and vehicle motion sensors, said sensors providing sensor signals;
a vehicle/environment sensing and perception processor being responsive to the sensor signals and providing processed sensor signals, said vehicle/environment sensing and perception processor including an object fusion sub-system that provides moving object detection, moving object fusion, stationary object detection and stationary object fusion, a vehicle path prediction sub-system that provides vehicle forward path estimation and vehicle backward path estimation, a lane/path estimation sub-system that provides forward lane path estimation and backward lane path estimation, a vehicle state and parameters estimation sub-system that provides vehicle speed estimation and vehicle lateral velocity estimation, and a road assessment sub-system that provides surface friction and condition estimation, road shoulder lane merge/split detection and road-bank and slope estimation;
a first motion planning processor responsive to the processed sensor signals from the vehicle/environment sensing and perception processor, said first motion planning processor using the processed sensor signals to provide lane center trajectory planning and tracking commands and lane change trajectory planning and tracking commands, said first motion planning processor providing desired longitudinal and lateral/roll dynamics signals and desired steering torque signals;
a second motion planning processor responsive to the processed sensor signals from the vehicle/environment sensing and perception processor, said second motion planning processor using the processed sensor signals to provide forward speed/target tracking command signals and backward speed and target tracking command signals, said sensor motion planning processor providing desired longitudinal dynamics signals;
a driver command interpreter responsive to primary driver command signals, said driver command interpreter interpreting driver's steering, braking and/or throttle command and generating desired longitudinal and lateral/roll signals, and desired steering torque signals;
a command integration processor responsive to the desired longitudinal and lateral/roll dynamics signals and the desired steering torque signals from the driver command interpreter, the desired longitudinal and lateral/roll dynamics signals and the desired steering torque signals from the first motion planning processor and the desired longitudinal dynamics signals from the second motion planning processor, said command integration processor providing reference vehicle dynamics for vehicle lateral, roll and longitudinal dynamics, and command integration for motion and advisory commands, said command integration processor outputting integrated longitudinal vehicle dynamics, integrated lateral/roll vehicle dynamics signals and integrated steering torque command signals;
a control integration and supervisory controller responsive to the integrated longitudinal dynamics signals, the integrated lateral/roll dynamics signals and the integrated steering torque command signals from the command integration processor, said control integration and supervisory controller receiving integrated longitudinal dynamics signals, integrated lateral/roll dynamics signals and steering torque command signals from the command integration processor and outputting integrated longitudinal force command signals, integrated lateral force command signals, integrated yaw moment command signals and steering torque command signals; and
a vehicle longitudinal controller and a vehicle lateral controller, said vehicle longitudinal controller being responsive to the integrated longitudinal force command signals and the integrated yaw moment command signals from the control integration and supervisory controller, and outputting brake torque command signals and engine throttle, gear shift and regenerative braking command signals, said vehicle lateral controller being responsive to the integrated yaw moment command signals, the integrated lateral force command signals and the steering torque command signals from the control integration and supervisory controller and outputting steering angle command signals and steering torque command signals.

11. The architecture according to claim 10 further comprising a human/machine interface processor providing driver assessment signals and driver request signals to the command integration processor and receiving integrated advisory command signals from the command integration processor.

12. The architecture according to claim 10 further comprising a brake controller for controlling vehicle brakes, a powertrain controller for controlling a vehicle powertrain and a steering controller for controlling vehicle steering, said brake controller being responsive to the brake torque command signals from the vehicle longitudinal controller, said powertrain controller being responsive to the engine throttle, gear shift and regenerative braking command signals from the vehicle longitudinal controller and said steering controller being responsive to the steering angle command signals and the steering torque command signals from the vehicle lateral controller.

13. The architecture according to claim 10 further comprising an antilock braking system, a traction control system, a vehicle stability enhancement system, an adaptive cruise control system and a collision preparation system all receiving and providing signals to the control integration and supervisory controller and the vehicle longitudinal controller.

14. The architecture according to claim 10 further comprising a lane keeping assist system providing signals to and receiving signals from the control integration and supervisory controller and the vehicle lateral controller.

15. The architecture according to claim 10 wherein the vehicle/environment sensing and perception processor further includes a moving target prediction sub-system that provides target speed prediction and target path prediction, a target objection selection processor that provides enhanced collision avoidance system for target object selection and freeway limited ability autonomous driving for target objection selection, a traffic assessment sub-system that provides traffic assessments and a threat assessment sub-system that provides enhanced collision avoidance for threat assessment and freeway limited ability autonomous driving for threat assessment.

16. A vehicle control architecture comprising:
a vehicle/environment sensing and perception processor for processing inputs from vehicle detectors, cameras, radar devices and sensors, said vehicle/environment sensing and perception processor providing processed sensor signals;
a motion planning processor responsive to the processed sensor signals from the vehicle/environment sensing and perception processor, said motion planning processor using the processed sensor signals to provide lane center trajectory planning and tracking commands, lane change trajectory planning and tracking commands and desired steering torque signals, said motion planning processor providing desired lateral/roll dynamics signals, forward speed/target tracking command signals and backward speed and target tracking command signals;
a driver command interpreter responsive to primary driver command signals, said driver command interpreter interpreting driver's steering, braking and throttle and outputting vehicle desired longitudinal, lateral/roll dynamics signals and desired steering torque command signals; and
a command integration processor responsive to the desired longitudinal and lateral/roll dynamics signals and the desired steering torque signals from the driver command interpreter and the desired longitudinal and lateral/roll dynamics signals and the desired steering torque signals from the motion planning processor, said command integration processor providing reference vehicle dynamics for vehicle lateral, roll and longitudinal dynamic, and command integration for motion and advisory information, said command integration processor outputting integrated longitudinal vehicle dynamic signals, integrated lateral/roll vehicle dynamics signals and integrated steering torque command signals.

17. The architecture according to claim 16 wherein the vehicle/environment sensing and perception processor includes an object fusion sub-system that provides moving object detection, moving object fusion, stationary object detection and stationary object fusion, a vehicle path prediction sub-system that provides vehicle forward path estimation and vehicle backward path estimation, a lane/path estimation sub-system that provides forward lane path estimation and backward lane path estimation, a vehicle state and parameters estimation sub-system that provides vehicle speed estimation and vehicle lateral velocity estimation, and a road assessment sub-system that provides surface friction and condition estimation, road shoulder lane merge/split detection and road-bank and slope estimation.

18. The architecture according to claim 17 further comprising a control integration and supervisory controller responsive to the integrated longitudinal dynamics signals, the integrated lateral/roll dynamics signals and the integrated steering torque command signals from the command integration processor, said control integration and supervisory controller providing control integration receiving integrated longitudinal dynamics signals, integrated lateral/roll dynamics signals and steering torque command signals from the command integration processor, and outputting integrated longitudinal force command signals, integrated lateral force command signals, integrated yaw moment command signals and steering torque command signals.

19. The architecture according to claim 18 further comprising a vehicle longitudinal controller and a vehicle lateral controller, said vehicle longitudinal controller being responsive to the integrated longitudinal force command signals and the integrated yaw moment command signals from the control integration and supervisory controller and outputting brake torque command signals and engine throttle, gear shift and regenerative braking command signals, said vehicle lateral controller being responsive to the integrated yaw moment command signals, the integrated lateral force command signals and the steering torque command signals from the control integration and supervisory controller and outputting steering angle command signals and steering torque command signals.

20. The architecture according to claim 19 further comprising a brake controller for controlling vehicle brakes, a powertrain controller for controlling a vehicle powertrain and a steering controller for controlling vehicle steering, said brake controller being responsive to the brake torque command signals from the vehicle longitudinal controller, said powertrain controller being responsive to the engine throttle, gear shift and regenerative braking command signals from the vehicle longitudinal controller and said steering controller being responsive to the steering angle command signals and the steering torque command signals from the vehicle lateral controller.

* * * * *